United States Patent [19]

Le Gressus et al.

[11] Patent Number: 5,624,625
[45] Date of Patent: Apr. 29, 1997

[54] PROCESS FOR THE PREPARATION OF CERAMIC MATERIALS FREE FROM AUTO-ADHESION UNDER AND DURING AGING

[75] Inventors: Claude Le Gressus, Fontenay le Fleury; Claude Faure, Lesigny; Pierre Bach, Maison-Alfort; Guy Blaise, Clichy; Daniel Treheux, Villeurbanne, all of France

[73] Assignee: Commissariat a l'Energie Atomique, Paris, France

[21] Appl. No.: 486,893

[22] Filed: Jun. 7, 1995

Related U.S. Application Data

[62] Division of Ser. No. 119,139, Oct. 25, 1993, Pat. No. 5,435,946.

[30] Foreign Application Priority Data

Mar. 21, 1991 [FR] France ................... 91 03454

[51] Int. Cl.⁶ ................................................. B29C 71/04
[52] U.S. Cl. .................... 264/406; 264/434; 264/40.1; 324/456
[58] Field of Search .................... 264/406, 40.1, 264/65, 56, 67, 60, 436, 408, 430, 434–435; 324/456

[56] References Cited

U.S. PATENT DOCUMENTS

| | | | |
|---|---|---|---|
| 2,873,506 | 2/1959 | Rawson et al. | 264/65 |
| 3,020,619 | 2/1962 | Koch | 264/40.1 |
| 3,407,866 | 10/1968 | Sawchuk | 264/60 |
| 3,414,641 | 12/1968 | Miller | 264/408 |
| 3,652,378 | 3/1972 | Mistler | 264/60 |
| 3,671,275 | 6/1972 | Gates, Jr. et al. | 264/61 |
| 3,711,585 | 1/1973 | Muta et al. | 264/65 |
| 3,899,560 | 8/1975 | Sellers et al. | 264/65 |
| 3,900,542 | 8/1975 | Palmour, III et al. | 264/40.1 |
| 4,894,255 | 1/1990 | Page et al. | 427/38 |
| 5,242,298 | 9/1993 | Sernetz | 264/1.21 |
| 5,296,171 | 3/1994 | Christin et al. | 264/22 |

FOREIGN PATENT DOCUMENTS

| | | |
|---|---|---|
| 2108363 | 9/1972 | Germany. |
| 2437821 | 3/1975 | Germany. |
| 2834146 | 2/1980 | Germany. |
| 61-14174 | 1/1986 | Japan ................... 264/434 |
| WO86/04548 | 8/1986 | WIPO. |

OTHER PUBLICATIONS

Journal of the American Ceramic Society, vol. 67, No. 21, Feb. 1984. C. J. of McHargue et al.: "Lattice Modification in Ion–Implanted Ceramics", pp. 117–123.

*Primary Examiner*—Jeffery R. Thurlow
*Attorney, Agent, or Firm*—Pearne, Gordon, McCoy & Granger

[57] ABSTRACT

Process for the preparation of ceramic materials for parts having friction surfaces subject to friction and free from auto/self-adhesion under stress or during aging. A precursor of the ceramic undergoes successive operations of pressing, sintering, polishing the surface obtained, cleaning the solid gangue resulting from the polishing, roasting in the presence of oxygen, and a doping treatment for increasing the dielectric susceptibility and homogeneity of the ceramic material adjacent the friction surfaces and to increase the mobility of the charges.

5 Claims, No Drawings

PROCESS FOR THE PREPARATION OF CERAMIC MATERIALS FREE FROM AUTO-ADHESION UNDER AND DURING AGING

This is a division of application Ser. No. 08/119,139, filed Oct. 25, 1993, now U.S. Pat. No. 5,435,946, issued Jul. 25, 1995.

The present invention relates to the field of dielectric insulating materials used under friction and in particular ceramic materials. Although such materials in particular comprise organic materials such as monolithic or composite insulants and polymers, the present invention will be described solely in connection with ceramics, but it must be understood that this only constitutes an example and must not be interpreted as having a limitative character with respect to the applications of the invention.

At present, there are numerous mechanical friction devices using mobile ceramic elements which are in mechanical contact with one another. This is in particular the case with heat motors, where ceramic parts slide with respect to one another. This is also the case with certain clutches, special bearings or running gears produced from ceramic parts. It also occurs to an ever increasing extent in the field of valves and fittings, where the ceramic material is ever more frequently used for producing valves.

The valves of taps or faucets are formed from two generally disk-shaped parts, which have off-centered openings with respect to the tap rotation axis and which can slide on one another. According to the relative position of one of the discs with respect to the other, the openings coincide to a greater or lesser extent making it possible to control the passage of a fluid. The surfaces of the contacting ceramic parts undergo a finishing treatment ensuring that they have a roughness and planeity appropriate for sealing the said tap. The use of ceramic parts in this field and in those referred to hereinbefore offers numerous advantages, including a perfect seal, an absence of wear even under a period of prolonged operation, unalterability and very high resistance to even the most aggressive or corrosive chemical agents.

In spite of this, it is unfortunately found that the adhesion forces between the ceramic parts in contact and under pressure spontaneously evolve as a function of numerous parameters and in particular the operating time. In particular, a prolonged stoppage under pressure of the use of said parts often leads to a considerable increase in the friction coefficient and sometimes even to seizing or total locking and this is virtually impossible to obviate. This defect of ceramic friction structures, for which hitherto there has been no remedy, casts doubts on the future of these products in such applications.

The present invention is directed at a process for the preparation of ceramic materials for friction parts free from self-adhesion phenomena under stress or during aging and which makes it possible to completely and definitively obviate the disadvantages referred to hereinbefore.

This process for the preparation of ceramic materials for parts subject to friction, in which the chemical component constituting the ceramic material is subject to the successive operations of pressing, sintering, polishing the surface obtained, cleaning the solid gangue resulting from the polishing and roasting in the presence of oxygen is characterized in that the preceding operations are completed by a treatment serving to increase the dielectric susceptibility and make it homogeneous in the mass in the vicinity of the friction surfaces which are to come into contact with one another and increase the mobility of the charges.

The essential means of the present invention consisting of treating the ceramics to obtain an increase in their dielectric susceptibility making it homogeneous in the mass has resulted from recent theoretical research which has revealed that the auto/self-adhesion, seizing and locking phenomena previously observed had an electrostatic origin.

The electrostatic theory of adhesion is based on the calculation of the pressure due to the presence of electrical charges localized at the interface of the insulating materials having different dielectric susceptibilities. It has experimentally been shown that a polarization energy accumulates in any insulating material around faults or defects (in the sense of the physics of solids) under the effect either of an electrical stress, or a mechanical stress. The higher the polarization energy, the greater the adhesion force. The said energy can be dissipated by relaxation with or without modification of the dielectric and this modification can extend to the destruction of the material.

Thus, the dielectric and mechanical properties of insulating materials are naturally correlated, because in two different forms they represent the properties of the material. The microscopic parameters leading to these properties are dependent on the dielectric susceptibility of the contacting materials, as well as the nature and density of the defects.

The solution for improving the non-adhesion properties consequently consists of a better distribution of the defects within the material, so that their density around the contact zones is as low as possible and consequently the charges trapped on these defects are distributed within the mass. This is the aim of increasing the susceptibility recommended in the process according to the invention.

According to a first feature of the ceramic material preparation process according to the invention, the dielectric susceptibility increase is obtained by doping the insulant with the aid of at least one metal oxide, which is preferably chosen from among manganese and titanium oxides. These two oxides have electrochemical properties making it possible for them, as soon as they are inserted by doping in the ceramic mass, to increase the mobility of the charges trapped in the potential wells of the material.

According to another feature of the process according to the invention, said same ceramic susceptibility increase is obtained by irradiation with the aid of ionizing rays. The ionizing rays, which are e.g. usually gamma or X-rays, increase the number of defects present in the vicinity of the surfaces in question and increase the mobility of the electric charges trapped in the potential wells surrounding the defects.

The intensity of the treatments performed for curing the surfaces of their natural tendency to increase the friction coefficient is left to the evaluation of the expert, bearing in mind that the present invention also proposes a process for checking the production of the thus obtained ceramics. This process is characterized in that the thus treated materials are examined with an electron microscope used as the electrostatic potential measuring probe and in that in this way the permittivity of the ceramic is determined, as well as the distribution of the defects and the electric power dissipatable in the dielectric medium constituting the ceramic without causing any deterioration of the latter.

In practice, the preparation of a ceramic free from an auto-adhesion phenomenon requires a first treatment phase, followed by a process of estimating the result obtained and then a complementary treatment and a further check may then be necessary. Thus, case by case, the expert will be able to monitor production in order to bring it to the point where the ceramic definitively has the desired properties.

An embodiment of the process according to the invention will now be described in an illustrative and non-limitative manner with respect to its performance conditions.

Consideration will be given to the case of industrial aluminas used for tap or faucet seals and shaped by conventional pressing, moulding and sintering processes. A polishing operation removes a material thickness of approximately 10 microns. Following the polishing operation the ceramic disks must have the requisite roughness and planeity in order to ensure the necessary seal. However, the surface is covered by a solid, thick and adhesive gangue formed from all the polishing products and waste materials. The gangue is cleaned in successive baths (different pH-values, temperature 200° C., ultrasonics). A final treatment, generally roasting in air or under oxygen at about 1500° C., makes it possible to saturate the bonds which might be available and relax the residual stresses. All these operations are known to the ceramic expert.

According to the invention, there is a modification of the distribution of the surface and volume defects remaining after machining, by doping and/or irradiation.

Doping increases the dielectric susceptibility of the surface layers. Thus, susceptibility is a macroscopic view of the defects. In order to modify it, diffusion takes place of one or more metal oxides. Examples are manganese or titanium oxide. The temperature and duration of the diffusion are determined with the aid of the electrostatic method described hereinafter. For example, a dielectric susceptibility gradient optimum was obtained by the diffusion of titanium oxide at 1300° C. for three minutes. With this doping, it is found that the friction noise is much lower, that there are no shaking effects and that friction is normal on starting. On reaching this production stage, it is necessary to check the production process.

On the basis of previously established correlations between the adhesion properties and the electrical properties, the treatment is optimized by electrostatic checks. This is an extremely sensitive, rapid and high performance process. It avoids the conventional mechanical operations normally consisting of measuring the friction coefficient after a large number of passages plane on plane.

Electrostatic production checks or inspections take place with a scanning electron microscope (SEM). The process consists of electrically charging an area of the insulating sample with the SEM beam at the nominal energy of the apparatus (e.g. 50 keV), followed by the observation of the irradiated area with the low energy SEM beam, e.g. 0.3 keV. The charged area reflects the beam and there is a "mirror effect". The measurement of the dimensions of the mirror as a function of the observation voltage makes it possible to plot a curve, whose gradient is correlated with the distribution of the defects and therefore the adhesion properties of the material. In this way the permittivity $\epsilon$ of the ceramic is determined, as well as the distribution of the defects and the electrical power which can be dissipated in the ceramic without leading to its deterioration. The optimum of a treatment (doping or irradiation) of the ceramic is obtained when the gradient of the curve reaches a maximum. Any standard commercial apparatus can be used, provided that it is equipped with a measuring system for the sample current and that it can operate at very low voltages.

We claim:

1. Process for the preparation of ceramic parts including friction surfaces having reduced auto-adhesion under stress and during aging, said process including the steps of:

(a) pressing ceramic material to form parts having said friction surfaces;

(b) sintering the ceramic material from step (a);

(c) polishing said friction surfaces of the sintered material from step (b) with the formation of solid gangue;

(d) cleaning said friction surfaces to remove said solid gangue resulting from the polishing in step (c);

(e) roasting the cleaned friction surfaces from step (d) in the presence of oxygen; and (f) doping the roasted surfaces of from step (e) with at least one metal oxide to provide said ceramic materials with increased dielectric susceptibility and homogeneity adjacent said friction surfaces.

2. Process for the preparation of ceramic parts according to claim 1, wherein the step of doping is carried out by a diffusion process.

3. Process for the preparation of ceramic parts according to claim 1 or 2, wherein said at least one metal oxide is selected from the group consisting of manganese oxide and titanium oxide.

4. Process for checking the manufacture of ceramic materials according to claim 1 wherein said ceramic material from step (f) has a permittivity $\epsilon$ defect distribution and dissipatable level of electrostatic power without deterioration thereof, and including the steps of determining the permittivity, defect distribution and dissipatable electrostatic power by measuring the electrostatic potential of the ceramic material using a scanning electron microscope.

5. Process for checking the manufacture of ceramic materials according to claim 4, including the steps of charging an area of the ceramic material from step (f) with a relatively high energy beam from said scanning electron microscope to form local electrical fields, applying a relatively low energy beam from said scanning electron microscope onto said charged area, and sensing the deflection of said low energy beam with said scanning electron microscope.

* * * * *